May 5, 1936. W. P. CHANDLER, JR 2,039,950
APPARATUS FOR EFFECTING INTIMATE CONTACT BETWEEN LIQUIDS AND GASES
Filed Nov. 2, 1934 2 Sheets-Sheet 1
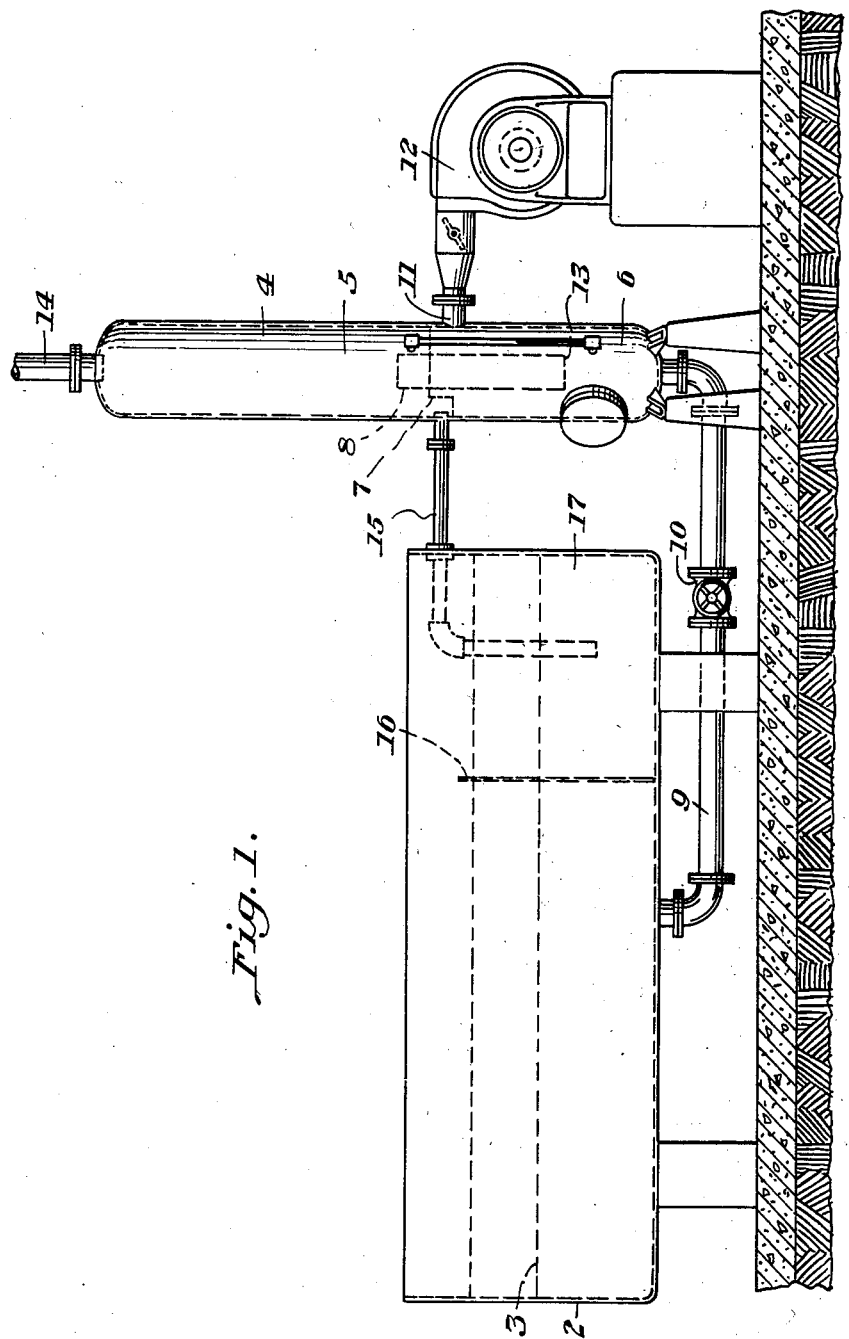

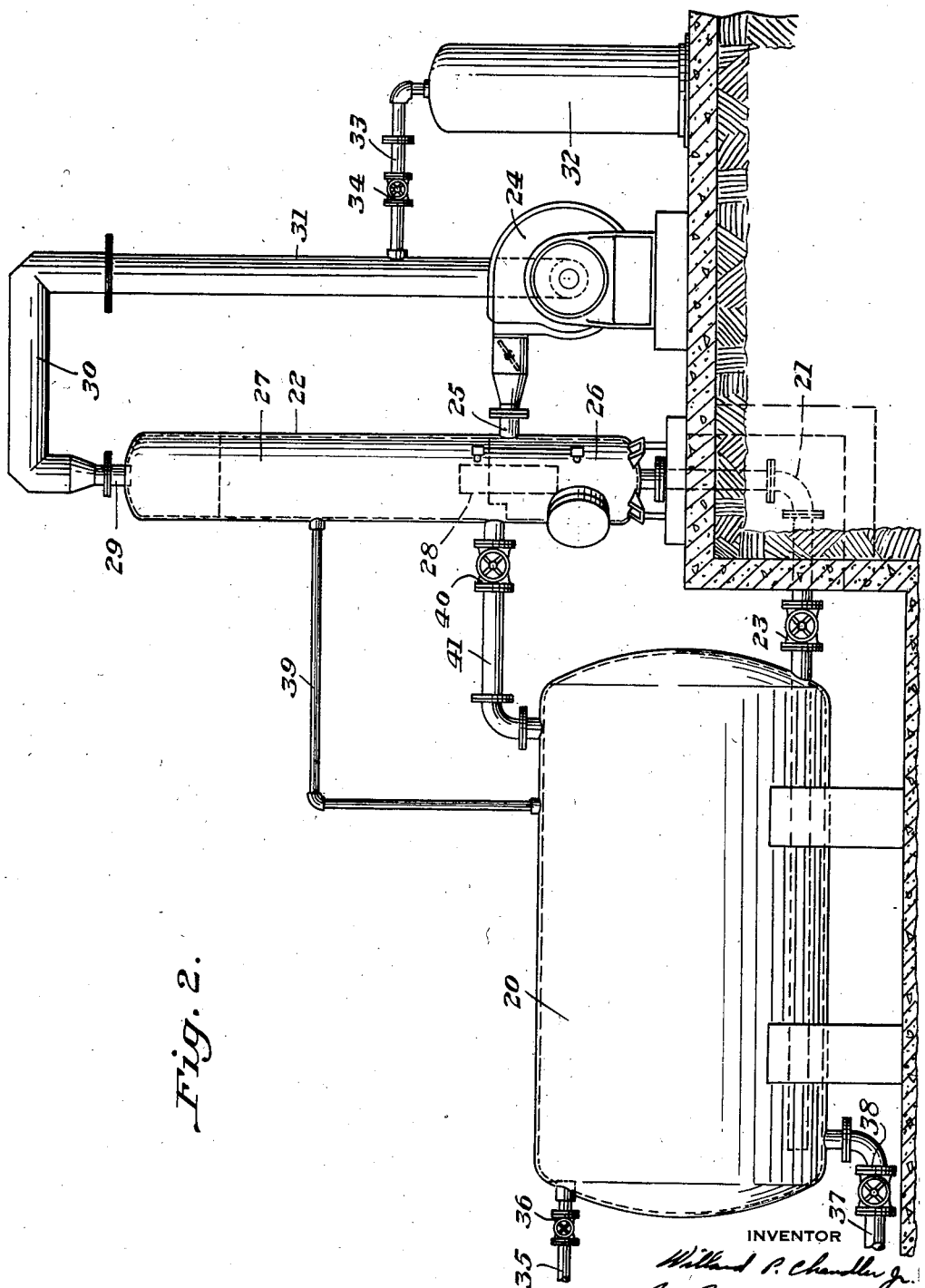

Patented May 5, 1936

2,039,950

UNITED STATES PATENT OFFICE 2,039,950

APPARATUS FOR EFFECTING INTIMATE CONTACT BETWEEN LIQUIDS AND GASES

Willard P. Chandler, Jr., Pittsburgh, Pa., assignor to Blaw-Knox Company, Pittsburgh, Pa., a corporation of New Jersey Application November 2, 1934, Serial No. 751,167

4 Claims. (Cl. 261—75)

The present invention relates to an improved apparatus for effecting intimate repeated contact between a liquid and a gas, and more particularly to an apparatus for conducting chemical processes involving the treating of a liquid with a gas by bringing them into intimate contact with each other.

There are many chemical processes in which chemical reactions take place between materials, one of which is at ordinary temperatures and pressures a liquid, and the other under like temperatures and pressures a gas. In bringing about the desired chemical reaction it is highly desirable that the process be carried out in a manner which will bring about the most efficient intimate contact between the liquid and the gas possible under the circumstances. The present invention is directed to an improved apparatus for circulating the liquid and gas for effecting an efficient intimate contact between the liquid and gas and for circulating them so that repeated contact therebetween may be had as desired to most effectively and efficiently attain the desired chemical reaction therebetween.

The character of the chemical process to be carried out is immaterial to the present invention. The liquid used may be a simple liquid and the gas may likewise be a simple gas, or the liquid may be a mixture of liquids with various materials dissolved in them and the gas may be a gas containing several different chemical compounds mixed together. The character of the chemical action is also immaterial to the present invention for the chemical action desired may take place between one or any number of the components of the gas.

In accordance with the present invention I have provided an apparatus for bringing about a circulation of both the liquid and gas so that the two are intimately mingled and circulated in such manner that the contacting of the gas and the liquid may be effected any desired number of times. In accordance with my invention, the same liquid may be treated in and circulated through the contact unit a number of times and, if desired, the same gas may be circulated repeatedly through the contact unit until that component of the gas which enters into chemical reaction with the liquid has been consumed or undergone the desired chemical change. This circulation of the gas and the liquid and their intimate contacting is brought about in accordance with my invention in a manner which is far more efficient than any of the presently known for carrying out the chemical reactions between liquids and gases.

In the accompanying drawings I have shown for purposes of illustration only several embodiments of my invention. It will be understood, of course, that my invention is not limited to the particular structures shown in the drawings and that my invention may be practiced and the advantages thereof obtained in various other types of apparatus.

In the drawings,—

Figure 1 is an elevational view of an apparatus embodying my invention.

Fig. 2 is an elevational view of a different embodiment of my invention.

In the embodiment shown in Figure 1, a tank 2 is provided for the batch of liquid 3 which is to be treated by the gas. A contact unit 4 is provided for effecting intimate contact between the liquid and the gas. The contact unit 4 comprises a chamber which is divided into an upper compartment 5 and a lower compartment 6 by a transverse partition 7. Communication between the upper compartment and the lower compartment is effected through a tubular passageway or contactor tube 8 which extends through the partition 7 and downwardly into the lower compartment. The liquid to be treated is supplied to the lower compartment 6 of the contact unit by means of piping 9 which connects with the lower part of the tank or reservoir 2 and the base of the lower compartment 6 of the contact unit. A valve 10 is provided in the pipe line 9 for effecting control or regulation of the quantity of liquid being fed from the tank or reservoir 2 to the contact unit.

The gas to be used for treating the liquid enters the lower compartment 6 through an inlet 11 which is below the partition 7 but above the normal level of liquid in the lower compartment of the unit. The gas may be forced into the contact unit by a blower 12 or any other suitable device for forcing the gas into the contact unit under sufficient pressure to cause a circulation of the liquid in the lower compartment of the contact unit upwardly through the contactor tube 8. The gas enters above the liquid level and passes along the surface of the liquid and upwardly beneath the release edge 13 of the tube 8 and atomizes the liquid and carries it upwardly through the tube. This circulation of the liquid upwardly through the tube 8 is effected by the maintenance of a pressure differential between the lower compartment and the upper compartment, and by reason of the atomizing of the liquid and the circulation thereof upwardly through the tube with the gas an intimate contact is effected between the two.

The general principles of a contactor of this type form no part of the present invention. The particular type of contact unit shown in the drawings is clearly shown and described, and the manner in which the intimate contact is effected described and claimed in the copending application of Donald A. Sillers, Serial No. 587,684, filed January 20, 1932, and reference is hereby made to said application for a further and more detailed description of the details and operation of a contactor of this character. It will suffice to state that the liquid level in the lower compartment of the contact unit is maintained in sufficiently close proximity to the release edge 13 of the tube 8 to cause the liquid to be atomized by the passage of the gas beneath the release edge.

The gas, after having intimately contacted the liquid, passes upwardly through the upper compartment 5 and out of the contact unit through an outlet 14.

The liquid, after having passed upwardly through the tube 8, is deposited on the dividing partition 7 and is returned by a pipe 15 to the tank 2 at a point below the surface of the liquid contained therein. A weir 16 is provided in the tank for dividing it into two compartments and this is for the purpose of providing a settling basin or compartment 17 into which any solids contained in the liquid may be precipitated. The provision of the weir 16 is desirable in the carrying out of many chemical processes, for the processes being carried out may be of such character as to have produced solids in the liquid and these solids can be precipitated out in the settling basin 17 and the clarified liquid permitted to flow over the weir 16. The material thus precipitated out may be readily removed from the settling basin when desired.

In the embodiment shown in Figure 1, the tank is open to the atmosphere and the gas used for circulation is air at atmospheric pressure. Apparatus of this character may be used where the process may be carried out at atmospheric pressure and it is not desirable to maintain the entire system under a pressure greater than atmospheric. In many cases, however, it is desirable to use a different gas than air and to prevent the liquid from at any time coming in contact with the air. In many cases it also may be desirable to maintain the system at greater than atmospheric pressure at all times. The apparatus shown in Figure 2 is adapted for just these purposes, whereas the apparatus shown in Figure 1 may not be used where it is desirable to prevent the liquid from contacting the air at any time, or where it is desired to maintain the entire system above atmospheric pressure.

Various types of chemical reactions may be efficiently carried out in the apparatus shown in Figure 1. As the particular process or processes to be carried out forms no part of the present invention, only one particular chemical reaction which may be carried out in apparatus of this character will be described. In the process of galvanizing iron or steel it is customary to cleanse the surface of the metal by immersing the sheets in some solution such as a dilute solution of sulphuric acid, the acid attacking the oxide on the metal surface and removing it so as to leave a clean surface for galvanizing. In this process ferrous sulphate is formed in the solution of the dilute acid used for treating or pickling the sheets, and it is desirable to get rid of the ferrous sulphate from the pickling solution. This may be accomplished by oxidizing the ferrous sulphate, the chemical reaction as usually conceived being:

$$4FeSO_4 + 2H_2O + O_2 = 4Fe(OH)SO_4.$$

The final product is ferric basic sulphate which forms as a flocculent precipitate and may be removed by simple settling in the precipitation or settling basin 17.

The oxygen necessary for this reaction is derived from the air and the intimate mixture of the air and the liquid is obtained in the contact unit 4. The pickling solution containing the ferrous sulphate passes from the tank 2 through the piping 9 into the contact unit and upwardly through the tube 8 where the intimate mixture of the air and the liquid is carried out. The liquid carrying the flocculent precipitate is then passed by the pipe 15 to the settling basin 17 where the ferric basic sulphate is permitted to settle. The uncontaminated solution then flows over the weir 16 into the large chamber of the tank where it may be used for further pickling after which it is again circulated through the contact unit.

It will be obvious that the apparatus shown in Figure 1 using air as the circulating gas to supply the oxygen has an unlimited supply and fresh air can be constantly circulated through the contactor only once and then discharged into the atmosphere. In some cases, however, it is highly desirable to provide for re-circulation of the gas through the contact unit in order to obtain the most efficient operation of the apparatus. Provision is made for this in the embodiment of the invention shown in Figure 2. In the embodiment shown in Figure 2 the apparatus is completely enclosed so that it does not need to be used with atmospheric air nor does it need to be operated at atmospheric pressure.

In the embodiment shown in Figure 2 an enclosed liquid tank 20 for holding a batch of liquid to be treated is provided. Piping 21 is provided for supplying the liquid to the contact unit 22. A valve 23 is provided in the pipe line connecting the enclosed tank and the contact unit for providing for regulation of the quantity of liquid being supplied to the contact unit. Contact unit 22 is similar to the contact unit 4 shown in Figure 1 and further description thereof is deemed unnecessary. The operation thereof and the general principles involved therein are fully set forth in the above referred to Sillers application.

In this embodiment a fan 24 is provided for blowing the gas to be used for treating the liquid into the contact unit through the inlet 25. The gas, after having been brought into intimate contact with the liquid in the lower compartment 26 passes into the upper compartment 27 through the contactor tube 28 and thence out of the chamber 27 through the outlet 29. The gas then passes through the pipe 30 and the pipe 31 and back to the blower 24 for re-circulation through the contact unit. If desired, however, the gas passing through the pipe 31 may be partially or wholly discharged into the atmosphere or otherwise so as to effect only a re-circulation of a portion of the gas or so as to circulate only fresh gas.

A gas supply tank 32 having a connection 33 with the pipe 31 is provided for supplying fresh gas to the blower 24 and a valve 34 is provided in the connection 33 for regulating the quantity of gas passing to the system for circulation through the contact unit.

No baffle or weir is shown in the liquid tank 20 in the embodiment shown in Figure 2 of the drawings, although it will be understood that a settling basin or chamber for precipitating solids may be introduced into the tank 20 so as to separate out any solid matter which may be introduced into the liquid by reason of the chemical reaction to which it is subjected in the contact unit.

The tank 20 is provided with an inlet 35 and a valve 36 for supplying and controlling the supply of liquid to the tank 20. An outlet 37 and a valve 38 are also provided for drawing off liquid from the tank after it has been appropriately treated. As may be seen, the liquid may be treated in batches and after the treatment has been completed the batch removed from the tank 20 and a new batch supplied thereto for treatment.

It will be apparent that the bulk of the liquid being treated and in the reservoir or tank 20 is below the contactor tube 28 of the contact unit. The level of the liquid in the tank may be maintained at any desired height but it is necessary that adequate liquid be maintained in the tank so that the level of the liquid in the lower compartment of the contact unit will be sufficiently close to the bottom edge of the contactor tube to cause the gas to circulate the liquid upwardly through the tube.

A bent pipe 39 from the upper compartment to the liquid tank is provided so as to maintain the same pressure in the tank 20 as that maintained in the upper compartment of the contact unit and also for the purpose of venting any gas in the tank 20 through the upper compartment of the contact unit.

The valve 40 is provided in the pipe line 41 connecting the upper compartment of the contact unit and the tank for regulating the flow of liquid from the upper compartment of the contact unit to the tank.

It will be obvious that since the entire equipment is enclosed from the atmosphere it is possible to operate with the gas at any desired pressure. It will also be apparent that by introducing either a heater or a cooler into the system, either in the circulating liquid, or in the gas line, or in the contactor, or tanks themselves, the temperature in the system may be maintained substantially at any desired degree.

Various types of chemical processes can be carried out in apparatus such as that disclosed in Figure 2. It will be apparent that a constant circulation of the batch of liquid through the contact unit and a constant circulation of gas may be maintained and appropriately regulated so as to obtain the most efficient operation. The liquid contained in the tank 20 may be treated by circulation through the contactor unit as many times as desired and after the treatment has been completed the entire batch may be drawn from the tank and a new batch supplied thereto for treatment. It will be apparent also that the gas can be re-circulated through the contact unit as often as desired, and that the gas re-circulated may be supplemented by any desired amount of fresh gas. It will also be apparent that the apparatus may be operated in such manner that no re-circulation of gas whatever is effected but fresh gas only is contacted with the liquid passing through the unit.

In view of the fact that various types of chemical reactions may be carried out in the apparatus shown in Figure 2 and in view of the fact that such chemical reactions form no part of the present invention, only one illustration of such a chemical process will be given. In the production of lime carbonate by treating lime hydroxide with carbon dioxide gas the following formula represents the chemical reaction:

$$Ca(OH)_2 + CO_2 = CaCO_3 + H_2O.$$

In this process the lime hydroxide is in solution or suspension in the liquid and the calcium carbonate produced by the oxidation process may be precipitated out or it may be kept in suspension in the liquid and withdrawn when the batch of liquid is changed. The lime hydroxide to be treated will be supplied to the tank 20 and will be continuously circulated through the contactor unit and contacted with the carbon dioxide gas until the chemical reaction has been completed. Thereafter the treated liquid will be removed and a new batch supplied for treatment.

It will be apparent from the above description that the apparatus which I provide is of such character that control of the circulation of the liquid and gas may be effected so as to provide circulation of the liquid and gas through the contactor at a suitable rate to secure the best results. It will also be obvious that the system shown in Figure 2 may be operated at any desired pressure and that the gas may be repeatedly circulated as many times as desired and replenished as consumed. In both embodiments the liquid is continuously circulated from the batch through the unit by the gas by reason of the fact that there is pressure difference between the gas in the lower compartment and the upper compartment of the contact unit. It will also be apparent that the apparatus which I provide effects an intimate contact between the liquid and gas in an extremely efficient manner and that the apparatus may be used for treatment of batches of liquid.

While I have shown and described several embodiments of my invention, it will be understood, as stated above, that I do not intend to be limited thereby for other embodiments of my invention may be used within the scope of the following claims.

I claim:

1. Apparatus for conducting chemical processes involving treating a liquid with a gas comprising a liquid and gas contact unit for effecting intimate contact between the liquid and gas, a liquid reservoir, means for continuously supplying liquid from said reservoir to said unit, means for passing gas through said unit in contact with liquid therein to effect a circulation thereof, means for continuously returning liquid circulated by the passage of gas through said unit to said reservoir, and means for returning gas passing through said unit for recirculation therethrough.

2. Apparatus for conducting chemical processes involving treating a liquid with a gas comprising a chamber having a transverse partition dividing the chamber into an upper compartment and a lower compartment, a conduit opening through the partition and projecting into the lower compartment, means for supplying gas under pressure to said lower compartment, a liquid reservoir, means for supplying liquid from said reservoir to said lower compartment, means for withdrawing gas from said upper compartment, means for conveying a liquid circulated through said conduit from the top of said partition to said reservoir, and means for maintaining the entire apparatus under pressure above atmospheric.

3. Apparatus for conducting chemical processes involving treating a liquid with a gas comprising a chamber having a transverse partition dividing the chamber into an upper compartment and a lower compartment, a conduit opening through the partition and projecting into the lower compartment, a liquid reservoir, means for supplying liquid from said reservoir to said lower compartment, means for supplying gas to said lower compartment under sufficient pressure to cause a circulation of liquid upwardly through said conduit into said upper compartment, means for withdrawing gas from said upper compartment, and means for conveying liquid passing into said upper compartment to said reservoir, said reservoir being so located with respect to the aforesaid chamber that the bulk of the liquid therein is below the conduit connecting the compartments of the chamber.

4. Apparatus for conducting chemical processes involving treating a liquid with a gas comprising a chamber having a transverse partition dividing the chamber into an upper compartment and a lower compartment, a conduit opening through the partition and projecting into the lower compartment, a liquid reservoir, means for continuously supplying liquid from said reservoir to said lower compartment, means for continuously supplying gas to said lower compartment under sufficient pressure to cause a circulation of liquid upwardly through said conduit into said upper compartment, means for continuously withdrawing gas from said upper compartment, means for continuously conveying liquid passing into said upper compartment to said reservoir, and means for regulating the rate of flow of liquid between said reservoir and said chamber.

WILLARD P. CHANDLER, Jr.

CERTIFICATE OF CORRECTION.

Patent No. 2,039,950. May 5, 1936.

WILLARD P. CHANDLER, JR.

It is hereby certified that error appears in the printed specification of the above numbered patent requiring correction as follows: Page 1, second column, line 1, after "known" insert the word apparatus; and that the said Letters Patent should be read with this correction therein that the same may conform to the record of the case in the Patent Office.

Signed and sealed this 30th day of June, A. D. 1936.

Henry Van Arsdale (Seal) Acting Commissioner of Patents.